United States Patent
Matsuda et al.

[11] Patent Number: 5,258,968
[45] Date of Patent: Nov. 2, 1993

[54] TRACKING ERROR SIGNAL GENERATING DEVICE FOR PREVENTING OFFSET OF THE GENERATED TRACKING ERROR SIGNAL

[75] Inventors: Norio Matsuda; Seiichi Ohsawa, both of Saitama, Japan

[73] Assignee: Pioneer Electronic Corporation, Tokyo, Japan

[21] Appl. No.: 132,090

[22] Filed: Dec. 11, 1987

[30] Foreign Application Priority Data

| Dec. 11, 1986 | [JP] | Japan | 61-296227 |
| Dec. 15, 1986 | [JP] | Japan | 61-299383 |
| Dec. 17, 1986 | [JP] | Japan | 61-300502 |
| Jan. 14, 1987 | [JP] | Japan | 62-7861 |

[51] Int. Cl.$^5$ .................................. G11B 7/09
[52] U.S. Cl. .................... 369/44.35; 369/44.32; 369/44.34; 369/54
[58] Field of Search ................... 369/43–46, 369/54, 124, 44.32, 44.34–44.36; 360/77.03

[56] References Cited

U.S. PATENT DOCUMENTS

| 4,243,850 | 1/1981 | Edwards | 369/46 |
| 4,476,555 | 10/1984 | Joichi et al. | 369/46 X |
| 4,497,048 | 1/1985 | Kimura . | |
| 4,506,149 | 3/1985 | Utsumi | 369/46 X |
| 4,520,469 | 5/1985 | Todokoro et al. . | |
| 4,583,209 | 4/1986 | Bierhoff | 369/46 |
| 4,613,961 | 9/1986 | Aarts | 369/44 |
| 4,616,354 | 10/1986 | Yoshida | 369/46 X |
| 4,617,654 | 10/1986 | Gross et al. | 369/46 |
| 4,707,817 | 11/1987 | Yoshio | 369/46 |
| 4,726,004 | 2/1988 | Takasago et al. | 369/46 |
| 4,748,610 | 5/1988 | Nakata et al. | 369/46 X |
| 4,807,214 | 2/1989 | Getreuer | 369/46 |

OTHER PUBLICATIONS

Ryder, J. D., "Electronic Fundamentals and Applications", 5th Edition, 1976, pp. 37–39, 459–462.

*Primary Examiner*—W. R. Young
*Attorney, Agent, or Firm*—Sughrue, Mion, Zinn, Macpeak & Seas

[57] ABSTRACT

A tracking error signal generating device using a four-segment detector in which signals from diagonally opposed elements are combined and the two so combined signals are phase compared. According to the invention, either before or during the combining, the output signals of the segments have high level components removed so as to reduce offsetting due to a non-uniform beam illuminating the detector.

3 Claims, 15 Drawing Sheets

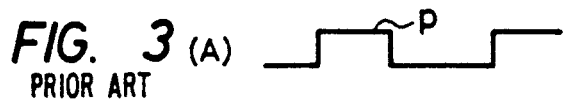
FIG. 3 (A) PRIOR ART
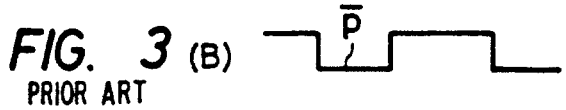
FIG. 3 (B) PRIOR ART
FIG. 3 (C) PRIOR ART
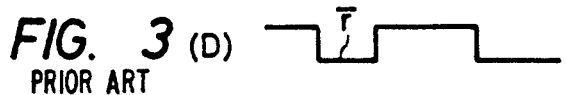
FIG. 3 (D) PRIOR ART
FIG. 3 (E) PRIOR ART
FIG. 3 (F) PRIOR ART
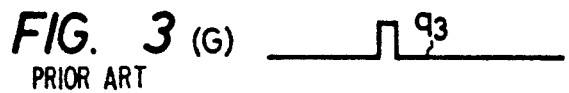
FIG. 3 (G) PRIOR ART
FIG. 3 (H) PRIOR ART
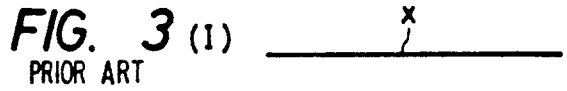
FIG. 3 (I) PRIOR ART
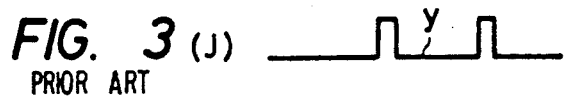
FIG. 3 (J) PRIOR ART
FIG. 5 (A) PRIOR ART
FIG. 5 (B) PRIOR ART
FIG. 5 (C) PRIOR ART
FIG. 5 (D) PRIOR ART

TRACKING ERROR SIGNAL GENERATING DEVICE FOR PREVENTING OFFSET OF THE GENERATED TRACKING ERROR SIGNAL

BACKGROUND OF THE INVENTION

1. Field Of The Invention

The present invention relates to tracking error signal generating devices and more particularly to a tracking error signal generating device for recording on or reproducing from an optical recording medium.

2. Background Art

A system for recording or playing back data on an optical recording disk is equipped with a so-called tracking error signal generating device for indicating how far a data detecting light spot of a pickup is separated from a recording track in the direction perpendicular to the recording track involved (radial direction of the disk). FIG. 1 shows an example of such an operation.

In FIG. 1, there is shown a four-segment light receiving element 1. The data detecting spot light of a pickup is incident upon a recording surface on the light receiving surface of the four-segment light receiving element 1. The four-segment light receiving element 1 is divided by two intersecting straight lines $\alpha$ and $\beta$ into four elements $1a$–$1d$ adjacent to each other so as to form four light receiving areas, as shown in FIG. 1. The outputs of the elements $1a$ and $1c$ disposed symmetrically with respect to the straight lines $\alpha$ and $\beta$ are respectively supplied via buffer amplifiers 102 and 103 to an adder 104, whereas the outputs of the elements $1b$ and $1d$ disposed at 90° thereto are respectively supplied through buffer amplifiers 105 and 106 to another adder 107.

The outputs of the adders 104 and 107 are subjected to waveform rectification by waveform rectifier circuits 108 and 109 before being supplied to a phase difference direction circuit 110. In the phase difference detection circuit 110, the output p of the first waveform rectifier circuit 108 is supplied to the clock input terminal of a D-type flip-flop 112 and the reset input terminal of a D-type flip-flop 114. Simultaneously, the output p of the first waveform rectifier circuit 108 is supplied to an inverter 115. An inverted signal $-p$ of the output p is sent out from the inverter 115 and supplied to the clock input terminal of a D-type flip-flop 111 and to the reset input terminal of a D-type flip-flop 113.

The output r of the second waveform rectifier circuit 109 is supplied to the reset input terminal of the D-type flip-flop 111 and to the clock input terminal of the D-type flip-flop 113. At the same time, the output r of the second waveform rectifier circuit 109 is supplied to an inverter 116. An inverted signal $-r$ of the output r is sent out from the inverter 116 and supplied to the reset input terminal of the D-type flip-flop 112 and to the clock input terminal of the D-type flip-flop 114.

A power supply voltage is applied to the D input terminals and to the set input terminal of all of the D-type flip-flops 111 to 114. The Q outputs $q_1$ and $q_2$ of the D-type flip-flops 111 and 112 are supplied through an OR-gate 117 to the inverting input terminal of a differential amplifier 118, whereas the Q outputs $q_3$ and $q_4$ of the D-type flip-flops 113 and 114 are supplied through an OR-gate 119 to the non-inverting terminal of the differential amplifier 118. The output of the differential amplifier 118 is sent out through a LPF (low-pass-filter) 120 as a tracking error signal e.

With the thus arranged previously described four-segment light receiving element 1, it is assumed that the center of the light spot formed by the light from the recording surface on the light receiving surface coincides with the intersection of the straight lines $\alpha$ and $\beta$ and that the straight line $\alpha$ is in parallel with the direction in which the pattern of the intensity distribution of light from the recording surface moves as the data detection light spot follows the recording track and is reflected by the series of pits forming the track. While the data detection light spot is following the recording track, the pattern of the intensity distribution of the light within the light spot formed on the light receiving surface of the light receiving element 1 quickly moves from the element $1a$ to the element $1b$ (downward in FIG. 1). for instance, and the pattern of the intensity distribution of the light is symmetrical with respect to the straight line $\alpha$. Then the phase difference between the waveform rectifying outputs p and r becomes "0" and the D-type flip-flops 111 to 114 remain in the reset state so that the outputs $q_1$–$q_4$ are kept at a low level. Consequently, there is produced no level difference between the inverting input x and the non-inverting input y of the differential amplifier 118. Accordingly, the output of the differential amplifier 118 is set at the ground level, whereby the level of the tracking error signal e produced by the LPF 120 becomes equal to the ground level.

Referring to FIG. 4, the following description will be made in a case where the data detection light spot is displaced inwardly in the radial direction and the pattern of the intensity distribution of the light within the light spot formed on the light receiving surface of the four-segment light receiving element 1 is displaced away from the element $1d$ and toward the element $1a$ (to the left in FIG. 2). This displacement along the line $\beta$ is semistatic as the light spot more quickly moves parallel to the line $\alpha$. FIG. 2(A) is a waveform chart of the waveform rectifying output p; FIG. 2(B) is a waveform chart of the inverted output $-p$; FIG. 2(C) is a waveform chart of the waveform rectifying output r: FIG. 2(D) is a waveform chart of the inverted output $-r$; FIG. 2(E) is a waveform chart of the Q output $q_1$: FIG. 2(F) is a waveform chart of the Q output $q_2$; FIG. 2(G) is a waveform chart of the Q output $q_3$: FIG. 2(H) is a waveform chart of the Q output $q_4$; FIG. 2(I) is a waveform chart of the out-of-phase (inverting) input x of the differential amplifier 118; and FIG. 2(J) is a waveform chart of the in-phase (non-inverting) input y of the differential amplifier 118.

When the pattern of the intensity distribution of the light is displaced away from the element $1d$ and towards the element $1a$ the waveform rectifying output p and the inverted output $-p$ precede in phase the waveform rectifying output r and the inverted output $-r$ by an angle corresponding to the displacement of the data detection light spot. Then the flip-flops 111 and 112 remain in the set state for a time interval corresponding to that angle so that the outputs $q_1$ and $q_2$ of Q are set at a high level for a time corresponding to that angle. At the same time, the flip-flops 113 and 114 are kept in the reset state and the outputs $q_3$ and $q_4$ of Q are left at a low level. Consequently, of the inverted input x and the non-inverted input y of the differential amplifier 118, only the inverted input x is kept at the high level for a time interval corresponding to the displacement of the data detection light spot. A negative pulse having a pulse width corresponding to the displacement of the data detection light spot along the line $\beta$ is produced by the differential amplifier 118 and sets the tracking error signal e produced by the LPF 120 to the negative level and further sets its absolute value proportional to the displacement of the data detection light spot.

FIG. 3 shows a time chart in a case where the data detection light spot is displaced in the opposite direction, that is, outwardly in the radial direction and the pattern of the intensity distribution of the light within the light spot formed on the light receiving surface of the four-segment light receiving element 1 is displaced away from the element 1a and toward the element 1d (to the right in FIG. 3). FIGS. 3(A) through (J) show similar signal waveforms to those shown in FIGS. 2(A) through (J). respectively.

When the pattern of the intensity distribution of the light is displaced away from the element 1a and toward the element 1d, the phases of the waveform rectifying output p and the inverted output −p are respectively delayed by an angle corresponding to the data detection light spot compared with the phases of the waveform rectifying output r and the inverted output −r. The flip-flops 113 and 114 are kept in the set state for a time corresponding to the angle involved and the outputs q$_3$ and q$_4$ of Q are kept at a high level for a time corresponding to the angle involved. Moreover, the D-type flip-flops 111 and 112 are held in the reset state, whereas the outputs q$_1$ and q$_2$ are held at the low level. Of the inverted input x and the non-inverted input y of the differential amplifier 118, only the non-inverted input y is set at a high level for a time corresponding to the displacement of the data detection light spot. Accordingly, a positive pulse having a pulse width corresponding to the displacement of the data detection light spot along the line $\beta$ is produced by the differential amplifier 118, thus causing the level of the tracking error signal e produced by the LPF 120 to be positive with its absolute value corresponding to the displacement of the data detection light spot.

In the conventional tracking error signal generating device, the position of the light spot formed on the light receiving surface of the four-segment light receiving element 1 moves from the position shown by a continuous line u in FIG. 4 to what is shown by a broken line v or w only when the objective lens of the pickup device containing the four-segment light receiving element 1 is caused to be displaced to effect the tracking control The deviation of the position of the data detection light spot on the recording surface of the recording medium from the recording track allows the quantities of light incident on the elements 1a through 1d to be unbalanced. However a similar case arises where the pattern of the intensity distribution of the light within the light spot formed on the light receiving surface of the four-segment light receiving element 1 becomes asymmetrical with respect to the straight line $\alpha$. That is, the separate elements 1a–1d measure area integrated intensities. If the beam is asymmetrical the detected center of the beam is displaced from the geometric center. When the light spot formed on the light receiving element 1 exists in the position shown by the broken line v of FIG. 4 for instance, the outputs of the elements 1a through 1d becomes as shown in traces (A) to (D) respectively of FIG. 5 and the amplitudes of the outputs of the elements 1a through 1d are unbalanced. Consequently the phase difference between the sum components of the diagonally disposed elements which are produced by the adder circuits 104 and 107 fail to accurately correspond to the distance between the geometric center of the data detection light spot and the recording track, thus causing the tracking error signal to be offset.

The occurrence of the offsetting causes the following disadvantage. A tracking error signal shown by a continuous line u' of FIG. 6(B) is produced when the light spot formed on the light receiving surface of the four-segment light receiving element 1 exists in the position shown by a continuous line u of FIG. 4. Then, the sum of the outputs of the elements 1a through 1d changes as shown in FIG. 6(A) owing to the track jumping movement of the data detection point On the other hand, when the light spot formed on the light receiving surface of the four-segment light receiving element 1 moves to one of the positions shown by the broken lines v and w of FIG. 4, the level of the tracking error signal changes as shown respectively by broken lines v' and w' of FIG. 6(B).

SUMMARY OF THE INVENTION

An object of the present invention is to provide a tracking error signal generating device capable of solving the above disadvantage of the conventional device, that is, capable of generating a tracking error signal free from offsetting.

The tracking error signal generating device according to one aspect of the present invention is arranged so that a portion of each of the outputs of the four elements of a four-segment light receiving element is eliminated by waveform processing, the output level of the eliminated portion being higher than a predetermined level. A signal is generated as a tracking error signal proportional to the phase difference between two signals obtained by adding up the outputs of pairs of elements symmetrical with respect to the intersection of two straight lines dividing the light receiving element into four elements.

The tracking error signal generating device according to a second aspect of the present invention is adapted to generate a signal corresponding to the phase difference between two signals obtained by using exclusive logical combinations of the outputs of pairs of light receiving areas symmetrically disposed with respect to the intersection of two straight lines dividing a four-segment light receiving element into four elements.

The tracking error signal generating device according to a third aspect of the present invention is characterized by comparing the output signal of each element of a four-segment light receiving element with the threshold value, converting the signal into a binary signal, using each EXOR gate for taking the exclusive logical sum of the binary signals from the elements relatively angularly positioned in the four-segment light receiving element, and generating a pulse signal with the polarity corresponding to the phase relation of the output signals of the respective elements set in the equal position relative to the track direction with the pulse width corresponding to the phase difference between the output signals of the two EXOR gates. Thus, a tracking error signal is obtained by integrating the pulse signals.

The tracking error signal generating device according to a fourth aspect of the present invention is adapted for generating a level detection signal corresponding to the signal output level of each of the four light receiving areas of the four-segment light receiving element. The level detection signal controls the signal level of the output component of each of the four light receiving areas on which the two adder means act. The adder means are used for respectively adding up the outputs of the pairs of light receiving areas disposed symmetrically with respect to the intersection of the two straight lines dividing the four-segment light receiving element. A signal is generated as a tracking error signal, corresponding to the phase difference between the outputs of the two adder means.

BRIEF DESCRIPTION OF THE DRAWINGS

FIG. 3(A-J) shows time charts representing the operation of each part of FIG. 1.

FIG. 5(A-D) shows time charts representing the output of each of the elements 1a-1d when the position of the light spot formed on the light receiving surface of the four-segment light receiving element 1 moves.

DETAILED DESCRIPTION OF THE PREFERRED EMBODIMENTS

The preferred embodiments of the invention will be described hereunder in more detail with reference to the accompanying drawings.

Figure 7:
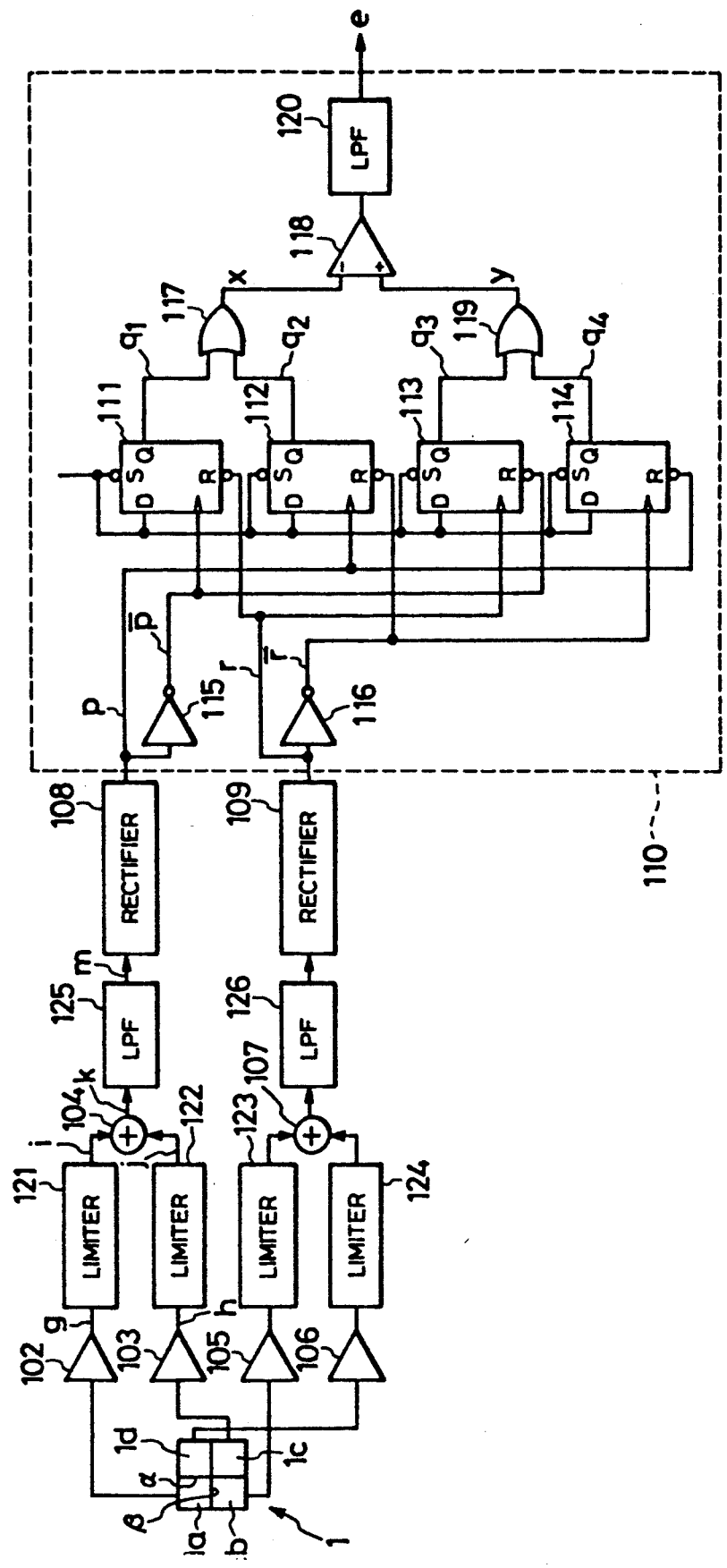
FIG. 7 is a block diagram showing a first embodiment of the present invention.

FIG. 7 shows a first embodiment of a tracking error signal generating device according to this invention.

Figure 1:
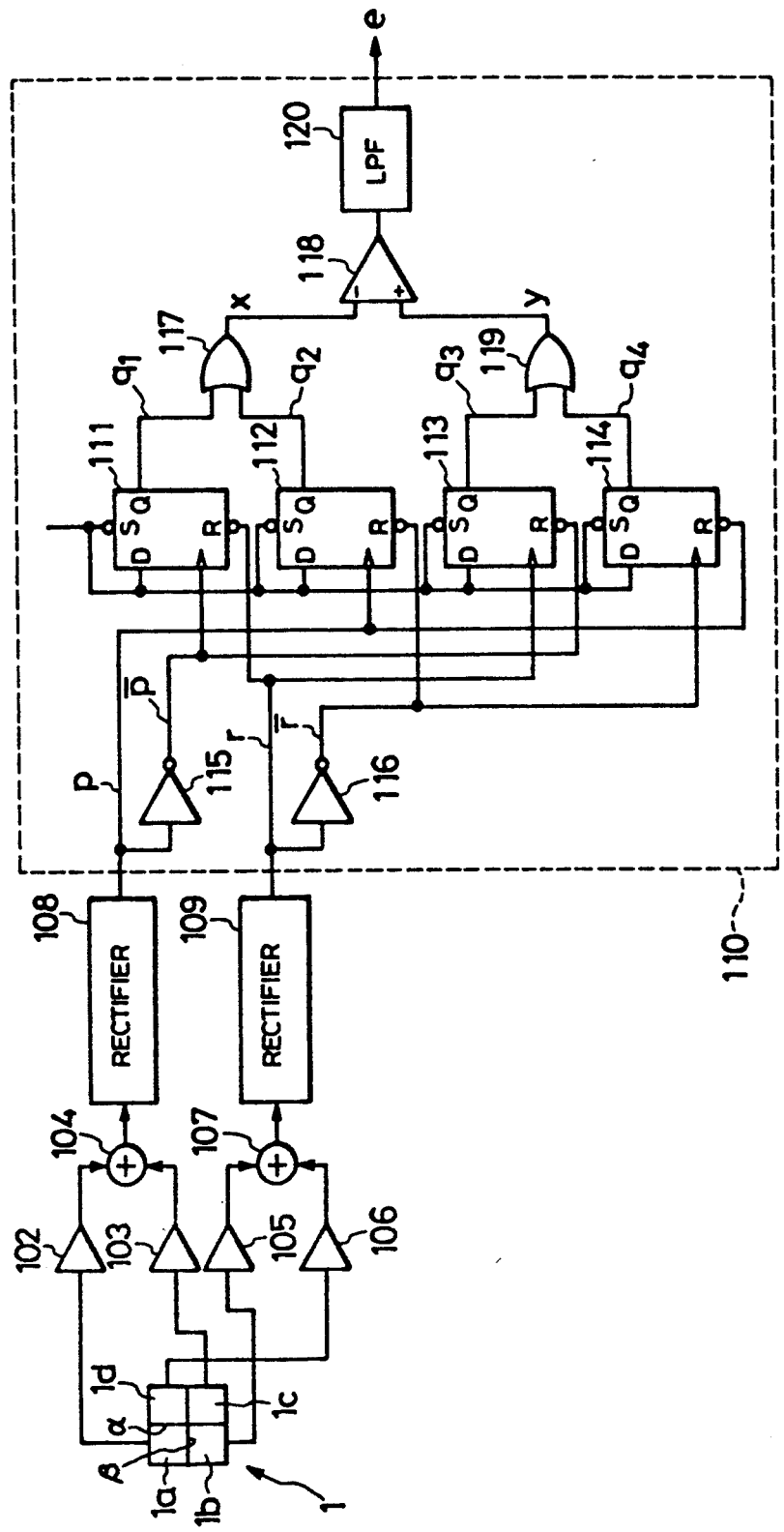
FIG. 1 is a block diagram showing a conventional tracking error generating device FIG. 2(A-J) shows time charts representing the operation of each part of the device shown in FIG. 1.
Figure 2A:
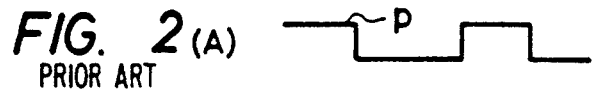
Figure 2B:
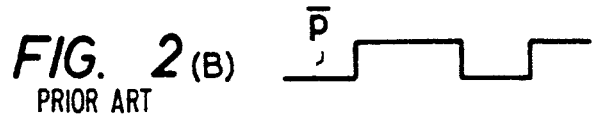
Figure 2C:
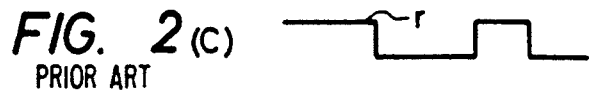
Figure 2D:
Figure 2E:
Figure 2F:
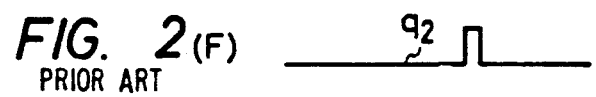
Figure 2G:
Figure 2H:
Figure 2I:
Figure 2J:
Figure 6A:
FIG. 6(A-B) is a diagram showing the relation between the position of the light spot formed on the light receiving surface of the four-segment light receiving element 1 and the waveform of the tracking error signal.
Figure 4:
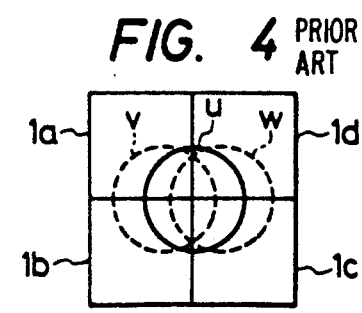
FIG. 4 is a diagram showing the position of the light spot formed on the light receiving surface of the four-segment receiving element 1.
Figure 6B:

In FIG. 7, a four-segment light receiving element 1 and buffer amplifiers 102, 103, 105 and 106 are connected in the same manner as shown in FIG. 1. However the outputs of the buffer amplifiers 102, 103, 105 and 106 are supplied to limiters 121, 122, 123 and 124 as waveform processing means, respectively. The limiters 121 through 124 operate to clip an input signal portion whose instantaneous level is greater than $V_1$ or less than $V_2$ to $V_1$ and $V_2$ respectively in order to limit the amplitude. The outputs of the limiters 121 and 122 are supplied to an adder 104. The output of the adder 104 is supplied through a LPF (low-pass filter) 125 to a waveform rectifier circuit 108 and the output whose waveform has been rectified therein is supplied to a phase difference detection circuit 110. The outputs of the limiters 123, 124 are supplied to an adder 107. The output of the adder 107 is supplied through an LPF 126 to another waveform rectifier circuit 109. Its output which has been rectified is supplied to the phase difference detection circuit 110.

Figure 8:
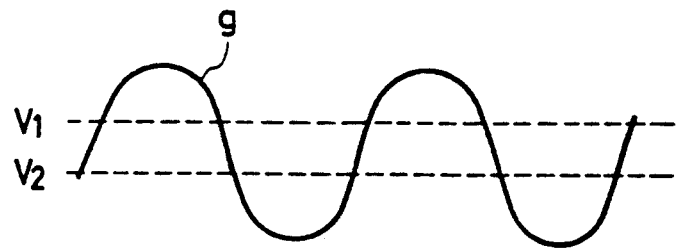
FIG. 8(A-G) shows time charts representing the operation of each part of the device shown in FIG. 7.
Figure 8:
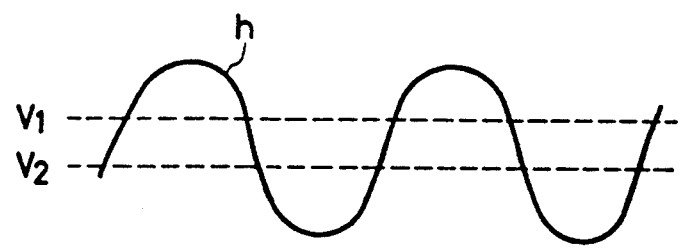
Figure 8:
Figure 8:
Figure 8:
Figure 8:
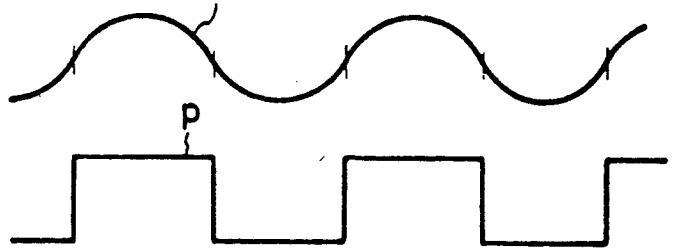
Figure 8:

When signals shown in FIGS. 8(A) and (B) are produced as the outputs g and h of the buffer amplifiers 102 and 103 with the aforesaid arrangement, portions whose instantaneous level is greater than $V_1$ and less than $V_2$ are clipped by the limiters 121 and 122 so that signals having almost square waveforms shown in FIGS. 8(C) and (D) are obtained as the outputs i and j of the limiters 121, 122. When the outputs i and j of the limiters 121, 122 are added up by the adder 104, a thus added output k as shown in FIG. 8(E) is obtained. This added up output k this added up becomes a signal containing a higher harmonic, since both the outputs i and j are signals having almost square shape. The higher component of the added output k is eliminated by the LPF 125 and the output m of the LPF 125 becomes a signal having a waveform with clear zero-crossing points and is supplied to the waveform rectifier circuit 108. A waveform rectified output p having a square waveform shown in FIG. 8(G) is outputted from the waveform rectifier circuit 108 and supplied to the phase difference detection circuit 110. Simultaneously a similar waveform rectified output r having a square waveform is outputted from the waveform rectifier circuit 109 and is supplied to the phase difference detection circuit 110.

The phase difference between the waveform rectified outputs p and r becomes "0" as in the case of the device shown in FIG. 1 when the data detection light spot is accurately tracing the recording track. The D-type flip-flops 111 to 114 in the phase difference detection circuit 110 remain in the reset state at that time and the Q outputs $q_1-q_4$ also remain at a low level. Consequently there develops no level difference between the inverting input x and the non-inverting input y of the differential amplifier 118. Thus, the output of the differential amplifier 118 is also set at the ground level so that the level of the tracking error signal e produced by the LPF 120 becomes equivalent to the ground level.

When the pattern of the possibly asymmetrical intensity distribution of the light within the light spot formed on the light receiving surface of the four-segment light receiving element 1 is displaced in the direction viewed from the element 1d toward the element 1a (to the left in FIG. 7). for instance, as the data detection light spot is displaced in the inner peripheral direction, the phases of the waveform rectified output p and the inverted output −p precede those of the waveform rectified output r and the inverted output −r by an angle corresponding to the displacement of the data detection light spot. Then the flip-flops 111 and 112 in the phase difference detection circuit 110 are placed in the set state only for a time corresponding to that angle, whereas the flip-flops 113 and 114 are kept in the reset state. Consequently, of the non-inverted input y and the inverted input x of the differential amplifier 118, only the inverting input x is kept at a high level for a time corresponding to the displacement of the data detection light spot and a negative pulse having a pulse width corresponding to the displacement of the data detection light spot is outputted from the differential amplifier 118. The level of the tracking error signal e becomes negative then and its absolute value becomes a value corresponding to the displacement of the data detection light spot.

For opposite movement that is, when the pattern of the intensity distribution of the light within the light spot formed on the light receiving surface of the four-segment light receiving element 1 is displaced in the direction viewed from the element 1a toward the element 1d (to the right in FIG. 7). for instance, as the data detection light spot is displaced in the outer peripheral direction, the phases of the waveform rectified output p and the inverted output −p are delayed form those of the waveform rectified output r and the inverted output −r by an angle corresponding to the displacement of the data detection light spot. Then the flip-flops 113 and 114 in the phase difference detection circuit 110 are placed in the set state only for a time corresponding to that angle, whereas the flip-flops 111 and 112 are kept in the reset state. Consequently, of the non-inverted input y and the inverted input x of the differential amplifier 118, only the non-inverted input y is kept at a high level for a time corresponding to the displacement of the data detection light spot. Thus, a positive pulse having a pulse width corresponding to the displacement of the data detection light spot is produced by the differential amplifier 118. The level of the tracking error signal e becomes positive then and its absolute value becomes a value corresponding to the displacement of the data detection light spot.

Even though the position of the light spot formed on the light receiving surface of the four-segment light receiving element 1 is displaced thus causing the amplitudes of the outputs of the elements 1a through 1d to be unbalanced, the amplitudes of the outputs of the limiters 121 through 124 do not change but remain constant as long as the amplitudes of the outputs of the elements 1a through 1d are such that the amplitude limiting action of the limiters 121 through 124 is effective. Since the phase difference between the outputs of each pair of limiters 121 and 123 or 112 and 124 corresponding to the outputs of each pair of elements 1a and 1b or 1c and 1d disposed symmetrically with respect to the straight line β will not change irrespective of the position of the light spot formed on the light receiving surface, no phase difference between the outputs of the adder circuits 104 and 107 occurs and, therefore, offsetting is prevented from being produced in the tracking error signal.

Figure 9:
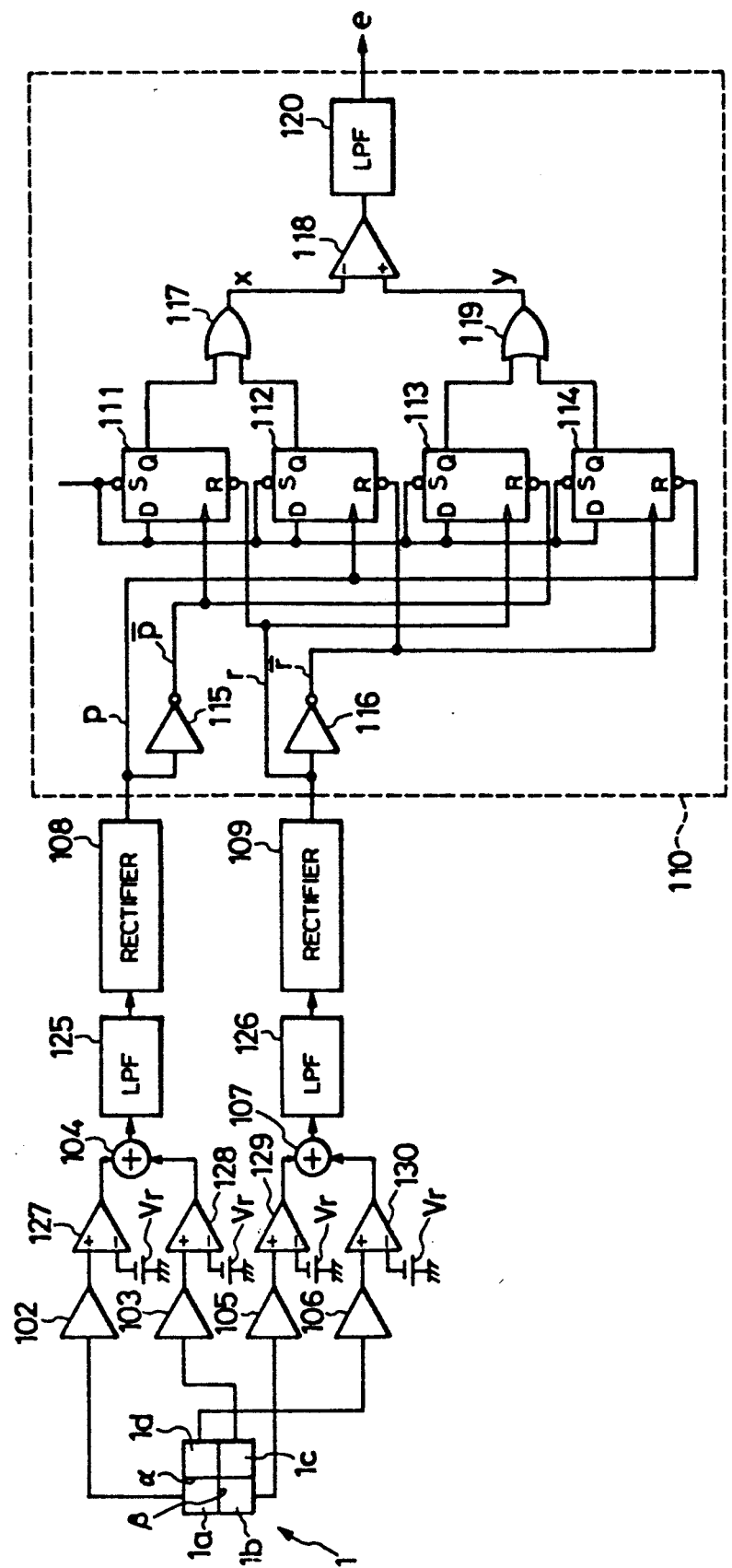
FIG. 9 is a block diagram showing a second embodiment of the device of the present invention.

FIG. 9 is a block diagram showing a second embodiment of the present invention, wherein the four-segment light receiving element 1, the buffer amplifiers 102, 103, 105 and 106, the adder circuits 104 and 107, the LPFs 125 and 126, the waveform rectifier circuits 108 and 109 and the phase difference detection circuit 110 are connected in the same manner as shown in FIG. 7. In this embodiment however the outputs of the buffer amplifiers 102, 103, 105 and 106 are respectively supplied to comparators 127, 128. 129 and 130 as waveform processing means. Each of the comparators 127 to 130 is so arranged as to compare the instantaneous level of the output of each of the buffer amplifiers 102, 103, 105 and 106 with a reference voltage $V_r$. Each of the outputs of the comparators 127 and 128 is supplied to the adder circuit 104. Moreover, each of the outputs of the comparators 129 and 130 is supplied to the other adder circuit 107.

Even though the amplitudes of the outputs of the elements 1a through 1d are unbalanced as the position of the light spot formed on the light receiving surface of the four-segment light receiving element 1 is displaced, the amplitudes of the outputs of the comparators 127 through 130 are made constant, provided the amplitudes of the outputs of the elements 1a through 1d are boosted to the extent that the instantaneous levels of the inputs of the comparators 127 through 130 exceed the reference voltage $V_r$, so that offsetting is prevented from being produced in the tracking error signal e.

In the tracking error signal generating device according to the present invention as set forth above in detail, an output of each of the four elements of the four-segment light receiving element is subjected to waveform processing in which that portion of the output having a level higher than a predetermined level is eliminated. The signal is employed as the tracking error signal corresponding to the phase difference between two signals obtained by adding up the outputs of the pair of the elements disposed symmetrically with respect to the intersection of two straight lines dividing the four-segment element into four elements. Accordingly, the amplitudes of the outputs of the four elements are made constant even though the on-track position of the intensity center of the light spot formed on the light receiving surface of the four-segment light receiving element is displaced from the center line of the element. At the same time, the phase difference between the two signals are obtained by adding up the outputs of the pair of elements disposed symmetrically with respect to the intersection of the two straight lines dividing the four-segment element into the four elements. Thereby, offsetting is prevented from being produced in the track error signal.

Figure 10:
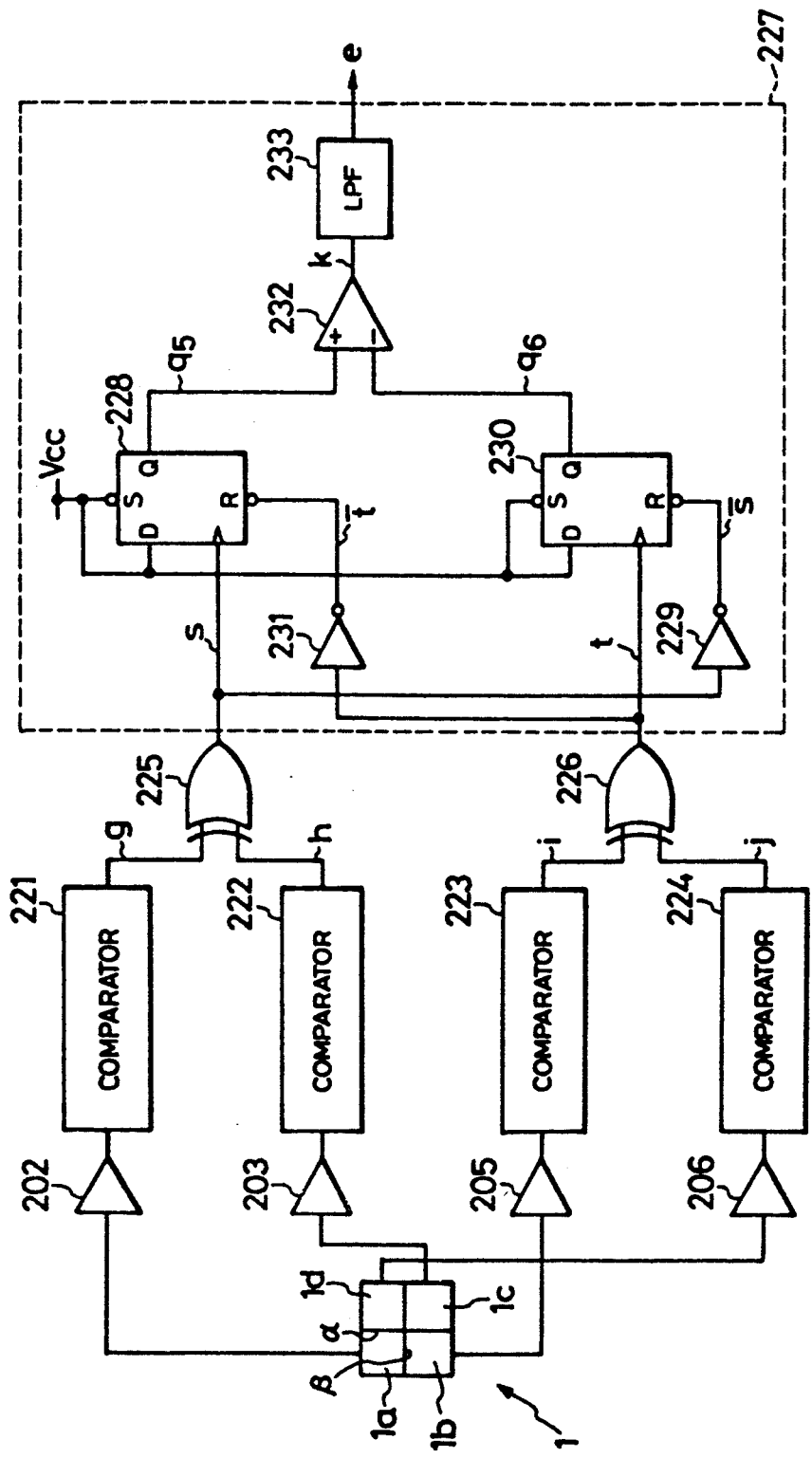
FIG. 10 is a block diagram of a third embodiment of the device of the present invention FIG. 11 (A-L) shows time charts representing the operation of each part of the device as shown in FIG. 10.

FIG. 10 shows a third embodiment of the tracking error signal generating device according to this invention.

As shown in FIG. 10, a four-segment light receiving element 1 and buffer amplifiers 202, 203, 205 and 206 are connected in the same manner as shown in FIGS. 1 and 7. However, the outputs of the buffer amplifiers 202, 203, 205 and 206 are each subjected to waveform rectification by waveform processing circuits 221, 222. 223 and 224, respectively. The waveform processing circuits 221 to 224 comprise comparators for comparing the instantaneous levels of the outputs of the buffer amplifiers 202, 203 205 and 206 with a reference level and producing respective signals corresponding to the results of comparisons. The outputs g and h of the comparator circuits 221 and 222 are supplied to a logical exclusive-OR circuit 225, whereas the outputs i and j of the comparators circuits 223 and 224 are supplied to another exclusive-OR circuit 226. The outputs s and t of the exclusive-OR circuits 225 and 226 are supplied to a phase difference detection circuit 227. In the phase difference detection circuit 227, the output s of the first exclusive-OR circuit 225 is supplied to the clock input terminal of a first D-type flip-flop 228 and to an inverter 229. An inverted signal −s of the output s is outputted from the inverter 229 and supplied to the reset input terminal of a second D-type flip-flop 230. The output t of the second exclusive-OR circuit 226 is supplied to the clock input terminal of the second D-type flip-flop 230 and to an inverter 231. An inverted signal −t of the output t is outputted form the inverter 231 and is supplied to the reset input terminal of the first D-type flip-flop 228.

Power supply voltage is applied to the D input terminals and the set input terminals of the flip-flops 228 and 230. The Q output $q_5$ of the first flip-flop 228 is supplied to the non-inverting input terminal of a differential amplifier 232. The Q output $q_6$ of the second flip-flop 230 is supplied to the inverting input terminal of the differential amplifier 232. The output of the differential amplifier 232 is produced through an LPF 233 as a tracking error signal e.

Figure 11:
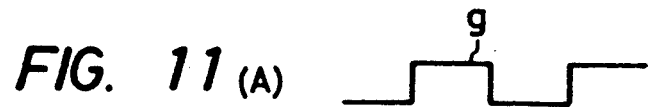
Figure 11:
Figure 11:
Figure 11:
Figure 11:
Figure 11:
Figure 11:
Figure 11:
Figure 11:
Figure 11:
Figure 11:
Figure 11:

With the aforesaid arrangement, it is assumed that the four-segment light receiving element 1 is arranged so that the center of a light spot of the light from a recording surface on the light receiving surface coincides with the intersection of straight lines $\alpha$ and $\beta$ and that the receiving element 1 is parallel with the direction in which a pattern of the intensity distribution of the light from the recording surface moves when the data detection light spot follows the recording track. While the data detection light spot follows the recording track, the pattern of the intensity distribution of the light within the light spot formed on the light receiving surface of the light receiving element 1 moves in the direction viewed from the element 1b to the element 1a (in the upward direction in FIG. 10). Then, in the on-track position, the pattern of the intensity distribution of the light is symmetrical with respect to the straight line $\alpha$. Referring to FIG. 11, the operation of each part in the above case will be described hereunder.

FIG. 11(A) is a time chart of a waveform rectified output g: FIG. 11(B), a time chart of a waveform rectified output i; FIG. 11 (C), a time chart of a waveform rectified output h FIG. 11 (D). a time chart of waveform rectified output j: FIG. 11(E), a time chart of the output s of the exclusive-OR circuit 225; FIG. 11 (F,. a time chart of an inverted output −s; FIG. 11(G), a time chart of the output t of the exclusive-OR circuit 226 FIG. 11(H), a time chart of an inverted output −t: FIG. 11(I), a time chart of a Q output $q_5$; FIG. 11(J), a time chart of a Q output $q_6$; FIG. 11(K), a time chart of the output k of the differential amplifier 232; and FIG. 11(L), a time chart of a tracking error signal e.

As shown in FIGS. 11(A) through (D). for the on-track position, the phase differences between the waveform rectified outputs g and j and between the outputs h and i become "0". Then, the phase difference between the outputs s and t of the exclusive-OR circuits 225 and 226 also becomes "0", whereby the flip-flops 228 and 230 are held in the reset state. Consequently, the Q outputs $q_5$ and $q_6$ remain at low levels and the output of the differential amplifier 232 is set at the ground level, whereas the level of the tracking error signal e produced by the LPF 233 becomes equal to the ground level.

Figure 12:
FIG. 12(A-L) shows time charts representing the operation of each part of the device as shown in FIG. 10 when the data detection light spot deflects in the inner peripheral direction.
Figure 12:
Figure 12:
Figure 12:
Figure 12:
Figure 12:
Figure 12:
Figure 12:
Figure 12:
Figure 12:
Figure 12:
Figure 12:
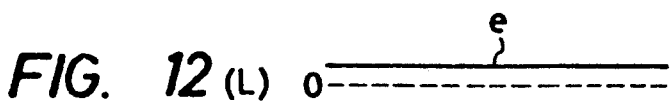

Referring to FIG. 12 the following description will be made in the case where the data detection light spot is displaced in the inner peripheral direction and further where the pattern of the intensity distribution of the light within the light spot is displaced in the direction viewed from the element 1d to the element 1a (to the left in FIG. 12). FIGS. 12(A) through (L) show the same signal waveforms as those illustrated in FIGS. 11(A) through (L).

When the asymmetrical pattern of the intensity distribution of the light is displaced in the direction viewed from the element 1d to the element 1a, the phases of the waveform rectified outputs i and j are delayed from the phases of the respective waveform rectified outputs h and g by an angle corresponding to the displacement of the data detection light spot. Then, the phase of the output s of the exclusive-OR circuit 225 precedes the phase of the output t of the exclusive-OR circuit 226 by an angle corresponding to the displacement of the data detection light spot and the flip-flop 228 is placed in the set state for a period of time corresponding to that angle, so that the Q output $q_5$ is set at high levels. The D-type flip-flop 230 is held in the reset state and the Q output $q_6$ is left at low levels. Consequently, a positive pulse having a pulse width corresponding to the displacement of the data detection light spot is produced by the differential amplifier 232 and, therefore, the level of the tracking error signal e produced by the LPF 233 becomes positive with its absolute value corresponding to the displacement of the data detection light spot.

Figure 13:
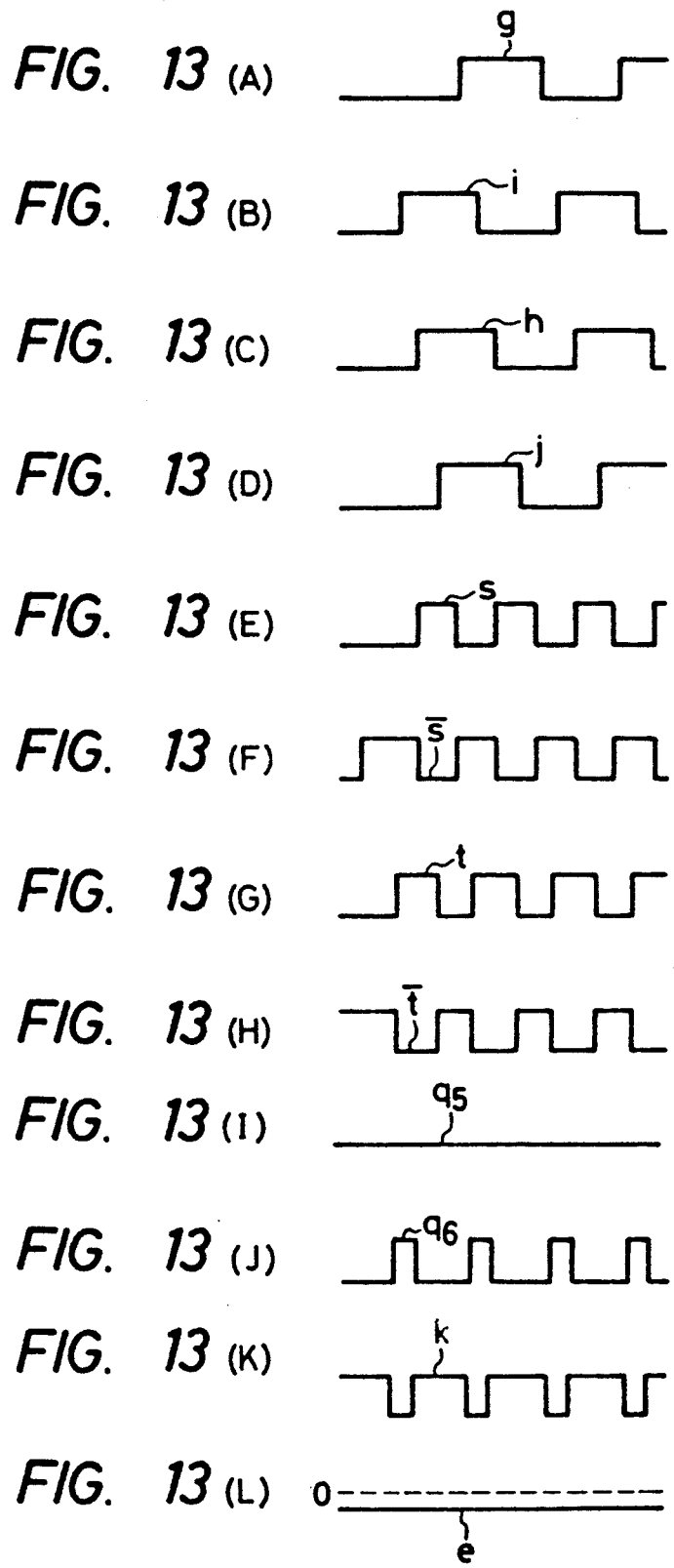
FIG. 13(A-L) shows time charts representing the operation of each part of the device as shown in FIG. 10 when the data detection light spot deflects in the outer peripheral direction.

Referring to FIG. 13, the following description will further be made for the opposite case where the data detection light spot is displaced in the outer peripheral direction and where the pattern of the intensity distribution of the light within the light spot is displaced in the direction viewed from the element 1d to the element 1a (to the right in FIG. 13). FIGS. 13(A) through (J) show the same signal waveforms as those illustrated in FIGS. 12(A) through (J).

When the pattern of the intensity distribution of the light is displaced in the direction viewed form the element 1a to the element 1d, the phases of the waveform rectified outputs i and j precede the phases of the waveform rectified outputs h and g respectively, by an angle corresponding to the displacement of the data detection light spot. Then, the phase of the output s of the exclusive-OR circuit 225 is delayed from the phase of the output t of the exclusive-OR circuit 226 by an angle corresponding to the displacement of the data detection light spot. The flip-flop 230 is placed in the set state for a period of time corresponding to that angle so that the Q output $q_6$ is set at high levels. The flip-flop 228 is held in the reset state and the Q output $q_5$ is left at low levels. Consequently, a negative pulse having a pulse width corresponding to the displacement of the data detection light spot is produced by the differential amplifier 232 and, therefore the level of the tracking error signal e produced by the LPF 233 becomes negative with its absolute value corresponding to the displacement of the data detection light spot.

With the aforesaid arrangement, even though the center of intensity position of the light spot formed on the light receiving surface of the four-segment light receiving element 1 is displaced causing the amplitudes of the outputs of the elements 1a through 1d to be unbalanced, the amplitudes of the comparison outputs g through j produced by the comparator circuits 221 through 224 are free from changes and kept constant, provided that the amplitudes of the outputs of the elements 1a through 1d are increased to the extent that the peak level of each of the buffer amplifiers 202, 203, 205 and 206 exceeds the reference voltage of the comparator constituting each of the comparator circuits 221 through 224. This same comment applies to the embodiment of FIG. 9. Moreover, the phase differences between the pair of the waveform rectified outputs g and h and between that of the waveform rectified outputs i and j (respectively corresponding to the outputs of the pairs of elements 1a, 1b and 1c, 1d disposed symmetrically with respect to the straight line $\beta$) will not change irrespective of the changes of the position of the light spot formed on the light receiving surface. Thereby, no phase difference between the outputs s and t of the exclusive-OR circuits 225 and 226 occurs. Accordingly, offsetting is prevented from being produced in the tracking error signal.

Since the waveform rectified outputs g, i and h, j respectively corresponding to the outputs of the elements 1a 1c and 1b, 1d symmetrically disposed with the respect to those straight lines $\alpha$ and $\beta$ are supplied to the exclusive-OR circuits 225 and 226 a state transition point appears at each of the outputs of the exclusive-OR circuits 225 and 226 at the same time as that of the state transition point of each of the outputs of the elements 1a, 1c and 1b, 1d. That is, the transition point is a rising or falling edge. For this reason, the outputs of the exclusive-OR circuits 225 and 226 become signals each having a frequency almost twice as great as the waveform rectified outputs p and r in the conventional device shown in FIG. 1. Since the outputs of the exclusive-OR circuits 225 and 226 are supplied to the phase difference detection circuit 227, a pulse indicative of the phase difference between the outputs of the exclusive-OR circuits 225 and 226 is obtained by the two flip-flops 228 and 230 with the almost same period as exemplified in the conventional device. Accordingly, the tracking error signal generating device according to the present invention can be made simpler in construction than that of any conventional one.

In the aforesaid embodiment, reference has been made to the output of each of the elements 1a through 1d supplied through the comparator circuits 221 through 224 to the exclusive-OR circuits 225 and 226. However, the outputs of the elements 1a through 1d may directly by supplied to the exclusive-OR circuits 225 and 226, respectively, without employing the comparator circuits 221 through 224, provided that the threshold levels of the exclusive-OR circuits 225 and 226 are made equivalent to the standard levels of the comparators constituting the waveform rectifier circuits 221 through 224.

In the tracking error signal generating device according to the present invention as set forth above in detail, a tracking error signal is generated as a signal corresponding to the phase difference between the two signals obtained by using the exclusive-OR of the outputs of the pair of elements symmetrically disposed with the respect to the intersection of the two straight lines dividing the four-segment light receiving element into four elements. Even though the position of the light spot formed on the light receiving surface of the four-segment light receiving element changes thus causing the amplitudes of the outputs of the four elements of the four-segment light receiving element to be unbalanced, thereby, the phase difference between the two signals obtained by using the exclusive-OR signal is prevented from changing unless the phase data of the four elements, i.e., the edge data, is altered. Thereby, offsetting is prevented from being produced in the tracking error signal. Moreover, because the tracking error signal is being produced on the basis of the edge data, notwithstanding the fluctuation of the laser power, the tracking servo loop gain is prevented from fluctuating.

As compared with the conventional device, the number of D-type flip-flops can be decreased to provide a simple circuit arrangement and the lack of necessity of providing the adder circuits facilitates the formation of such a device in digital circuitry.

In such a tracking error signal generating device, however, the signals $q_5$ and $q_6$ are caused to have high levels alternately when the phase difference between the signals s and t exceeds the pulse widths of the signals s and t. This makes it impossible to obtain the signal k having the pulse width which represents the amount of deviation of the data detection light spot from the pit track, from the output of the differential amplifier 232.

Figure 14:
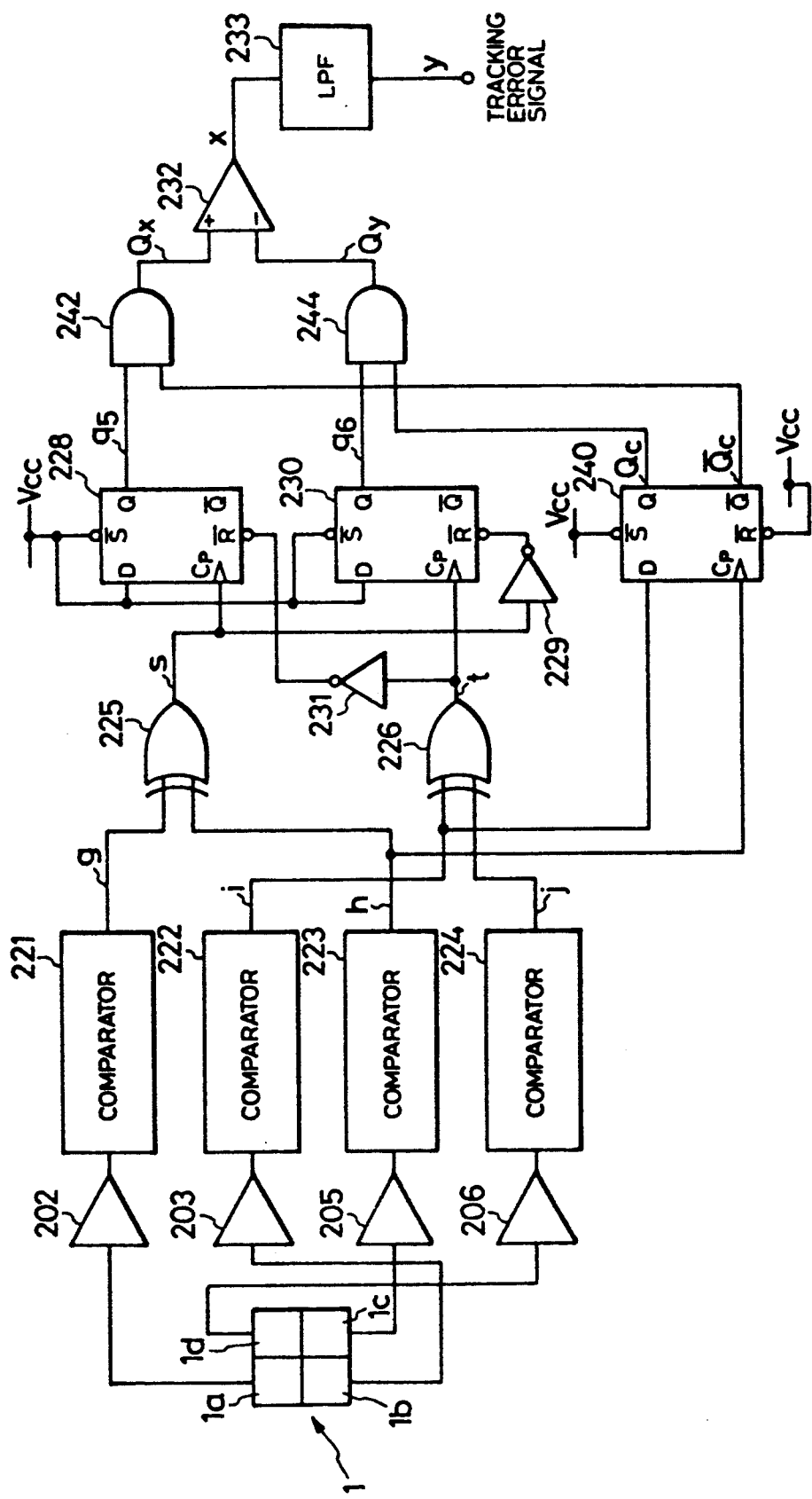
FIG. 14 is a block diagram of a fourth embodiment of the device of the present invention.

This disadvantage can be solved by a tracking error signal generating device as shown in FIG. 14.

FIG. 14 shows a fourth embodiment of a tracking error signal generating device according to the present invention. As shown in FIG. 14, a D-type flip-flop 240 and AND gates 242 and 244 are newly added to the device shown in FIG. 10. The data input terminal D of the new flip-flop 240 is connected to the output of the comparator 221, whereas its clock input terminal Cp is connected to the output of the comparator 223. Power supply voltage $V_{cc}$ is supplied to its set terminal S and its reset terminal R. The AND gate 242 takes the logical sum of the signal $q_5$ outputted from the output terminal of the flip-flop 228 and the signal $Q_c$ outputted from the output terminal of the flip-flop 240. Similarly, the AND gate 244 takes the logical sum of the signal $q_6$ outputted from the output terminal of the flip-flop 230 and the signal $Q_c$ outputted from the output terminal Q of the flip-flop 240. The output signals of the AND gates 242 and 244 are supplied to the differential amplifier 232. The arrangement excluding the aforesaid components is the same as that as shown in FIG. 10.

Figure 15:
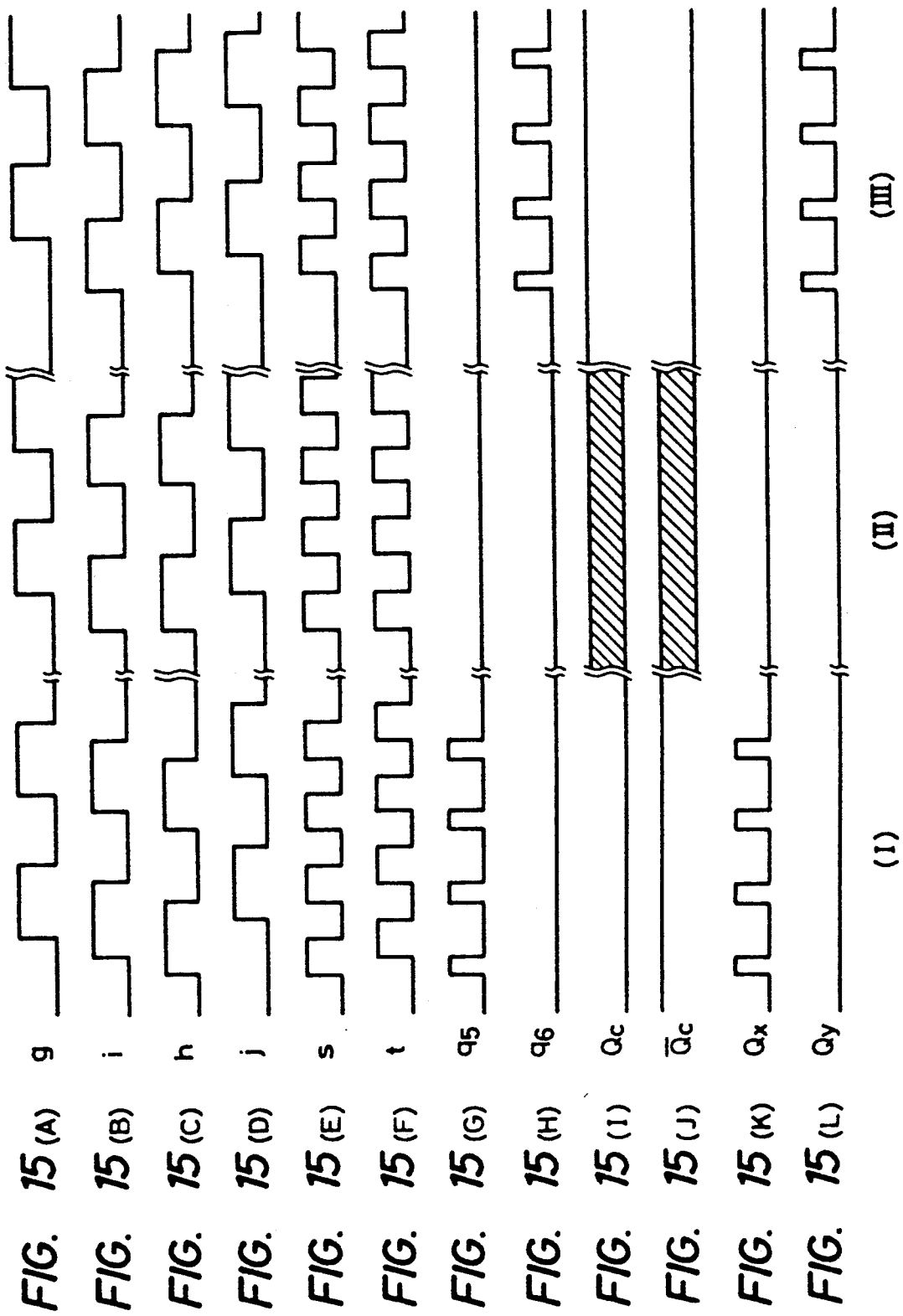
FIG. 15 shows time charts illustrating the operation of each part of the device as shown in FIG. 14.

In the tracking error signal generating device thus constructed, the operation up to the step where the signals $q_5$ and $q_6$ are produced by the flip-flops 228 and 230 is the same as shown in FIG. 14 and is shown in FIG. 15.

As also shown in FIG. 15, the comparator signal i outputted from the comparator 222 at the time of leading edge of the comparator signal h outputted from the comparator 223 is sent out from the output terminal Q of the additional flip-flop 240 as a signal $Q_c$ and the inverted signal of the signal $Q_c$ is outputted from the output terminal $-Q$ of the flip-flop 240 as a signal $-Q_c$.

Figure 16:
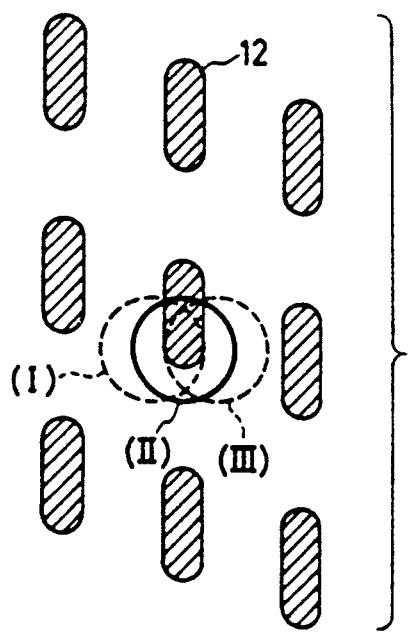
FIG. 16 is a diagram showing the relation between the data detection, light spot and the pit.

As shown in FIG. 16, when the data detection light spot (II) is located on the center line of the pit train 12, the output levels $q_5$ and $q_6$ of the flip-flops 228 and 229 remain at low levels as shown in the central (II) portion of FIG. 15. Therefore, the output levels $Q_x$ and $Q_y$ of the AND gates 242 and 244 are kept at low levels, irrespective of the signal $Q_c$, $Q_c$, so that the level of the tracking error signal Y becomes 0.

As shown in FIG. 16, when the data detection light spot (I) deviates from the center line of the pit train 12 to the inner side of the disk, the output signal $q_5$ of the flip-flop 228 has a pulse width, shown in the left portion (I) of FIG. 15, representing the amount of deviation relative to the pit train of the data detection light spot in a radial disk direction. At this time, the comparator signal i at the leading edge of the comparator signal h is kept at low levels and the signal $Q_c$ outputted from the additional flip-flop 240 is set at a low level and the signal $-Q_c$ is set al a high level. Accordingly, the signal $Q_x$ equivalent to the signal $q_5$ is obtained from the AND gate 242 and the output signal $Q_y$ of the AND gate 242 is set at a low level. The tracking error signal y is obtained through the differential amplifier 9 and the LPF 10 from the signals $Q_x$ and $Q_y$. If the phase difference between the signals s and t, that is, the pulse width of the signal $q_5$ becomes greater than the pulse widths of the signals s and t, the signals $q_5$ and $q_6$ are alternately set at high levels. However, since the signal $Q_c$ is kept at a low level, the output signal $Q_y$ of the AND gate 244 is set at a low level so that the influence of the signal $q_6$ onto the output of the differential amplifier 9 can be prevented.

When the data detection light (III) deviates from the center line of the pit train 12 to the outside of the disk, for instance, there can be obtained a signal $q_6$ from the flip-flop 228 having a pulse width representing the amount of deviation relative to the pit train of the irradiation beam spot in the other direction of the radial disk direction. At this time, since the comparator signal i remains at high levels at the point of the leading edge of the comparator signal h, the signal $Q_c$ outputted from the additional flip-flop 240 remains at a high level and the signal $-Q_c$ at a low level. Consequently, the signal $Q_y$ equivalent to the signal $q_6$ is obtained from the AND gate 244 so that the output signal $Q_x$ of the AND gate 242 is set at a low level. The tracking error signal Y is obtainable through the differential amplifier 9 and the LPF 10 from the signals $Q_x$ and $Q_y$. When the phase difference between the signals s and t, that is, the pulse width of the signal $q_6$, becomes greater than the pulse widths of the signals s and t, the levels of the signals $q_5$ and $q_6$ are alternately set at high levels. Because the output signal $Q_x$ of the AND gate 242 is kept at a low level as the signal $Q_c$ is kept at low levels, the influence of the signal $q_5$ on the output of the differential amplifier 232 can be prevented.

Figure 17:
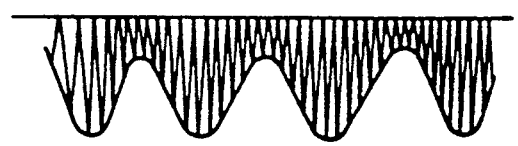
FIG. 17(A-B) shows time charts showing a RF signal and a tracking error signal at the time the beam spot pit train is crossed in the device of FIG. 14.
Figure 17:
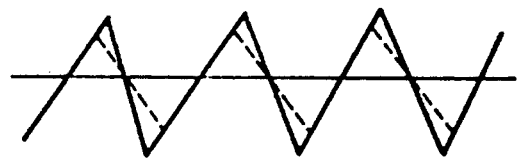

Parts (A) and (B) of FIG. 17 show an RF (high-frequency) signal and a tracking error signal (continuous line) when the data detection light spot crosses the pit train with the use of the tracking error signal generating device according to the present invention. The broken line of FIG. 17(B) shows a conventional tracking error signal waveform made available by a conventional device.

In the embodiment of the present invention, the comparator signal i is supplied to the data input terminal D of the flip-flop 240 and the comparator signal h is supplied to the clock input terminal $C_p$ thereof. However, the present invention is applicable not only to the aforesaid embodiment but also to an arrangement in which the comparator signal j is supplied to the data input terminal D of the flip-flop 240 with the comparator signal g supplied to the clock input terminal $C_p$.

In the tracking error signal generating device as set forth above the differential amplifier produces the pulse signal X with its polarity corresponding to the phase relation of the output signal of each element (1a, 1d or 1b, 1c) in the same train position with respect to the pit train direction at the pulse width equivalent to the phase difference between the output signals s and t of the two EXOR gates 225 and 226. Thereby, the signal X expressing the deviation of the irradiation beam spot from the pit trains can be obtained even though the phase difference between the signals s and t exceeds the pulse widths of those signals s and t. Accordingly, by using the tracking error signal obtained by integrating the pulse signals X, the tracking servo control range can far be enlarged.

Figure 18:
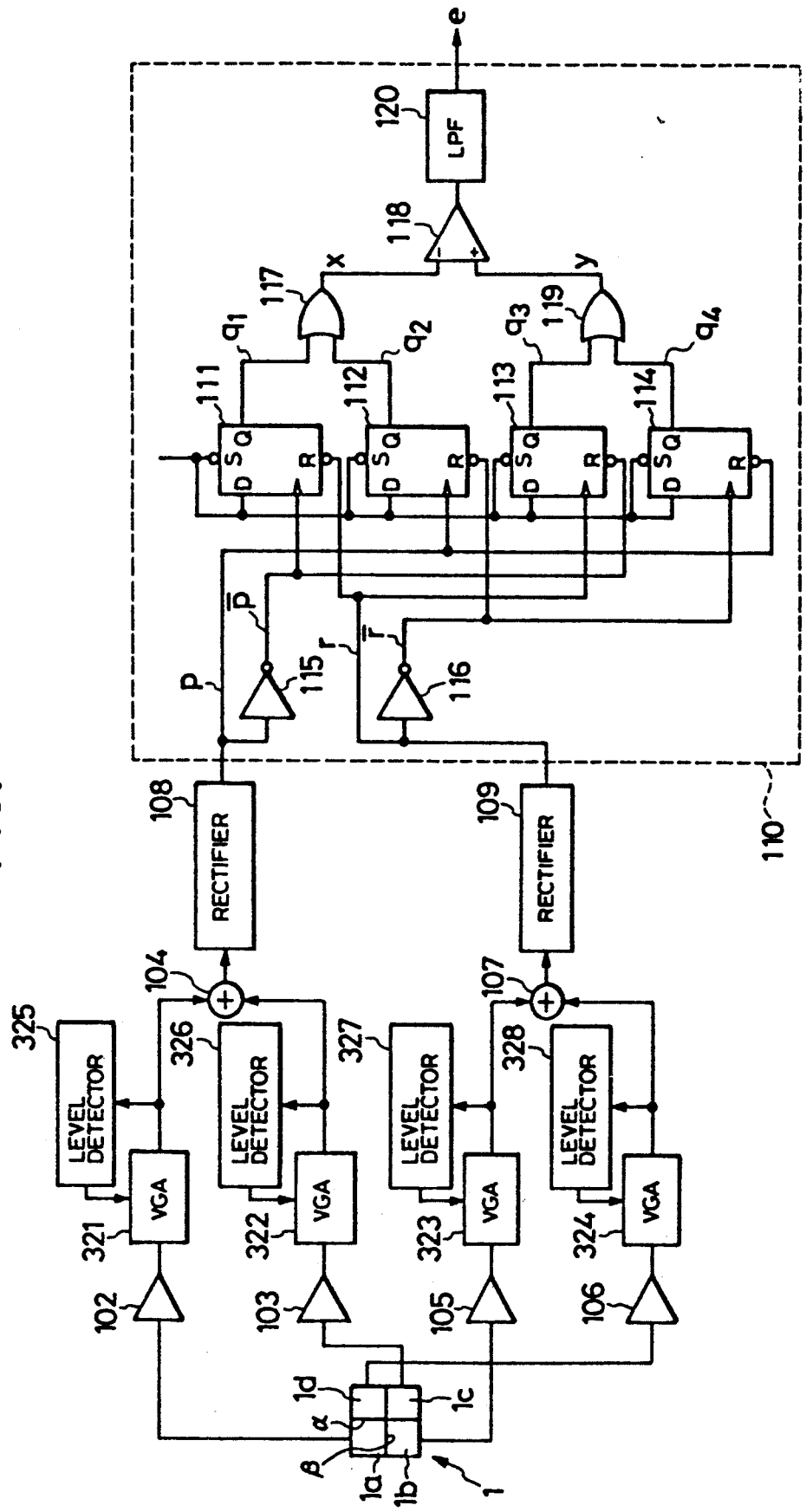
FIG. 18 is a block diagram showing a fifth embodiment of the device of the present invention.

FIG. 18 shows a fifth embodiment of a tracking error signal generating device according to this invention.

In FIG. 18, a four-segment light receiving element 1 and buffer amplifiers 102, 103, 105 and 106 are connected in the same manner as shown in FIGS. 1 and 7. In this embodiment, however, the outputs of the buffer amplifiers 102, 103, 105 and 106 are respectively supplied to variable gain amplifier circuits 321, 322, 323 and 324 and level control means. The variable gain amplifier circuits 321 through 324 are adapted to amplify the input signals with the gain corresponding to control signal levels. The outputs of the buffer amplifiers 102, 103, 105 and 106 thus amplified by the variable gain amplifier circuits 321 through 324 are respectively supplied to level detection circuits 325, 326, 327 and 328. Each of the level detection circuit 325, 326, 327 and 328 is formed with, for instance, an AM detection circuit and adapted to generate a level detection signal corresponding to the signal level of each of the outputs of the buffer amplifiers 102, 103, 105 and 106 amplified by the variable gain amplifier circuits 321, 322, 323 and 324. The output of each of the level detection circuits 325 through 328 is received as a control input of each of the variable gain amplifier circuits 321 through 324. The gains of the variable gain amplifiers 321 to 324 are reduced for higher detected levels of their outputs so they act as non-linear, gradually saturating amplifiers.

The output of each of the variable gain amplifier circuits 321 and 322 is supplied to the add circuit 104 for addition and synthesis. The output of each of the variable gain amplifier circuits 323 and 324 is supplied to the adder circuit 107 for addition and synthesis. The outputs of the adder circuits 104 and 107 are respectively supplied through waveform rectifier circuits 108 and 109 to the phase difference detection circuit 110.

With the aforesaid arrangement, the phase difference between the waveform rectified outputs p and r becomes "0" as in the case of the device shown in FIG. 7 while a data detection light spot follows a recording track. Then the D-type flip-flops 111 to 114 in the phase difference detection circuit 110 are kept in the reset state, wherein the Q outputs $q_1$–$q_4$ of the flip-flops 111 to 114 are held at low levels. Consequently, no level difference between the inverting input x and the non-inverting input y of the differential amplifier 118 occurs and the output of the differential amplifier 118 is set at the ground level. Thus, the level of the tracking error signal e produced by the LPF 120 becomes equal to the ground level.

When the data detection light spot is displaced in the inner peripheral direction, causing the pattern of the intensity distribution of the light within the light spot formed on the light receiving surface of the four-segment light receiving element 1 to be displaced in the direction viewed from the element 1d to the element 1a (to the left in FIG. 18). the phases of the waveform rectified output p and the inverted output —p precede the phases of the waveform rectified output r and the inverted output —r, respectively, by an angle corresponding to the displacement of the data detection light spot. Then the D-type flip-flops 111 and 112 in the phase difference detection circuit 110 are held in the set state for a time corresponding to that angle, whereas the D-type flip-flops 113 and 114 are left in the reset state. Consequently, of the inverted input x and the non-inverted input y of the differential amplifier 118, only the inverted input x is set at a high level for a time corresponding to the displacement of the data detection light spot and a negative pulse having a pulse width corresponding to the displacement of the data detection light spot is produced by the differential amplifier 118. The level of the tracking error signal e thus becomes negative with its absolute value corresponding to the displacement of the data detection light spot.

When the data detection light spot is displaced in the outer peripheral direction, causing the pattern of the intensity distribution of the light within the light spot formed on the light receiving surface of the four-segment light receiving element 1 to be displaced in the direction viewed from the element $1d$ to the element $1a$ (to the right in FIG. 18). the phases of the waveform rectified output p and the inverting output $-p$ is delayed from the phases of the waveform rectified output r and the inverted output $-r$, respectively, by an angle corresponding to the displacement of the data detection light spot. Then the flip-flops 113 and 114 in the phase difference detection circuit 110 are held in the set state for a time corresponding to that angle whereas the D-type flip-flops 111 and 112 are left in the reset state. Consequently, of the inverting input x and the non-inverting input y of the differential amplifier 118, only the non-inverting input y is set at a high level for a time corresponding to the displacement of the data detection light spot and a positive pulse having a pulse width corresponding to the displacement of the data detection light spot is produced by the differential amplifier 118. The level of the tracking error signal e thus becomes positive with its absolute value corresponding to the displacement of the data detection light spot.

In the aforesaid operation, even though the amplitudes of the outputs of the elements $1a$ through $1d$ are unbalanced as the position of the light spot formed on the light receiving surface of the four-segment light receiving element 1 is displaced, the gains of the variable gain amplifier circuits 121 through 124 change in proportion to the outputs of the level detection circuits 125 through 128, respectively. It is, accordingly, possible to equalize the levels of the output components of the elements $1a$ through $1d$ on which the adder circuits 104 and 107 act by limiting or approximating the output signal levels of the variable gain amplifier circuits 121 through 124 to a predetermined value. Moreover, the phase differences between the outputs of the variable gain amplifier circuits 321, 323 and 322, 324 corresponding to the outputs of the pairs of element $1a$, $1b$ and $1c$, $1d$ disposed symmetrically with respect to the straight line $\beta$ will not change irrespective of the intensity center position of the light spot formed on the light receiving surface, whereby no phase difference occurs between the outputs of the adder circuits 304 and 307. Therefore, offsetting is prevented from being produced in the tracking error signal e.

Figure 19:
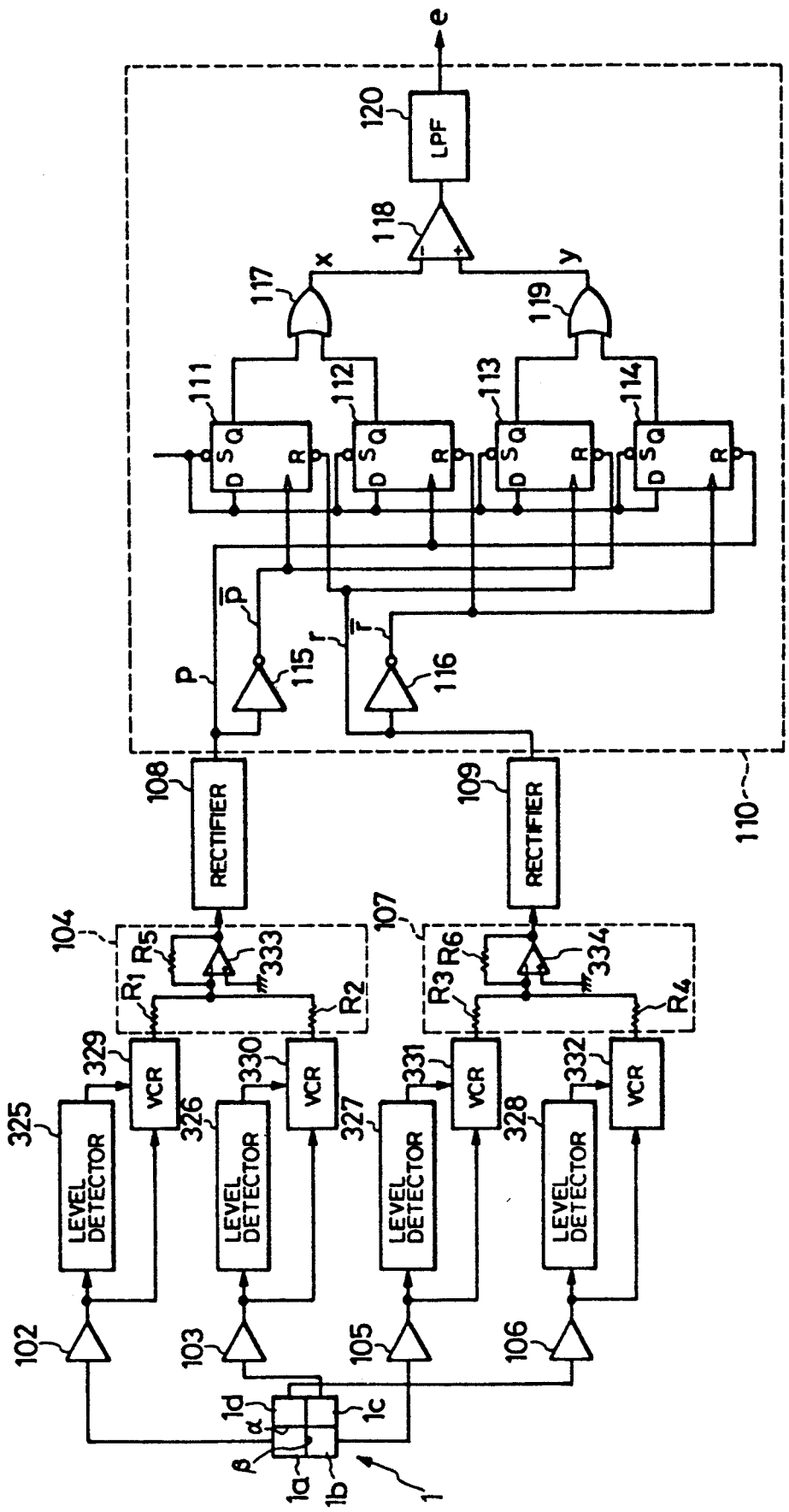
FIG. 19 is a block diagram showing a sixth embodiment of the device of the present invention.

FIG. 19 is a block diagram of a sixth embodiment of the present invention wherein the four-segment light receiving element 1, the buffer amplifiers 102. 103, 105 and 106 the adder circuits 104 and 107, the waveform rectifier circuits 108 and 109 and the phase difference detection circuit 110 are connected in the same manner as shown in FIG. 18. In this embodiment however, the outputs of the buffer amplifiers 102, 103, 105 and 106 are supplied directly to the level detection circuits 325 through 328 and to variable resistor circuits 329 through 332, respectively. The variable resistor circuits 329 through 332 are adapted to change their resistance values in direct proportion to the output levels of the level detection circuits 325 through 328, respectively. The outputs of the variable resistor circuits 329 and 330 are supplied to the adder circuit 104 for addition and synthesis, whereas the outputs of the variable resistor circuits 331 and 332 are supplied to the adder circuit 107. The adder circuits 104 or 107 comprises two input resistors $R_1$ and $R_2$ or $R_3$ and $R_4$, an operational amplifier 333 or 334, and a feedback resistor $R_5$ or $R_6$.

With the resistance values $R_a$ and $R_b$ of the variable resistor circuits 329 and 330 there is generated a signal obtained by multiplying the outputs of the buffer amplifiers 102 and 103 by coefficients $R_5/(R_1+R_a)$ and $R_5/(R_2+R_b)$, respectively, and added up in the adder circuit 104. With the resistance values $R_c$ and $R_d$ of the variable resistor circuits 331 and 332 likewise, there is generated a signal obtained by multiplying the outputs of the buffer amplifiers 105 and 106 by coefficient $R_6/(R_3+R_c)$ and $R_6/(R_3+R_d)$, respectively, and added up in the adder circuit 107. Accordingly, even though the amplitudes of the outputs of the elements $1a$ through $1d$ are unbalanced as the intensity center position of the light spot formed on the light receiving surface of the four-segment light receiving element 1 is displaced, the levels of the output components of the element $1a$ through $1d$ can be equalized within the outputs of the adder circuits 104 and 107. Therefore, offsetting can be prevented from being produced in the tracking error signal e in the same manner as is applicable to the device of FIG. 18.

As set forth above, the tracking error signal generating device according to the present invention is adapted to generating the level detection signal corresponding to the signal output level of each of the four light receiving areas of the four-segment light receiving element. The level detection signals control the signal levels of the output components of the four light receiving areas within the output of the two adder means which respectively add up the outputs of the pairs of the light receiving areas disposed symmetrically with respect to the two straight lines dividing the four-segment light receiving element. A signal is generated corresponding to the phase difference between the outputs of the two adder means as a tracking error signal. Accordingly even though the position of the light spot formed on the light receiving surface of the four-segment light receiving element is displaced the levels of the output components of the elements within the two signals obtained by adding up the outputs of the pairs of elements disposed symmetrically with respect to the two straight lines dividing the four-segment light receiving element into the four elements are made more nearly equal to each other to make the phase difference between the two signals less changeable, so that offsetting can be prevented from being produced in the tracking error signal.

What is claimed is:

1. A tracking error signal generating device, comprising:
   a light receiving element having four light receiving areas divided by two lines intersecting at a point for receiving a light beam reflected from a recording medium in a vicinity of said point;

at least two adders for adding up respective output signals of respective pairs of said light receiving areas arranged diagonally across said two intersecting lines;

waveform processing means, connected between said light receiving element and said at least two adders, for removing from each of said light receiving area output signals that part of an amplitude thereof which is above a first predetermined level and for removing from each of said light receiving area output signals that part of an amplitude thereof which is below a second predetermined level which is less than the first predetermined level;

and a phase detector for detecting a phase difference between outputs of said adders to thereby produce a tracking error signal.

2. A tracking error signal generating device as recited in claim 1, wherein said waveform processing means comprises limiters for limiting respective amplitudes of said light receiving area output signals.

3. A tracking error signal generating device as recited in claim 1, wherein said waveform processing means comprises four limiters for limiting respective amplitudes of said light receiving area output signals.

* * * * *